(12) United States Patent
Ashline et al.

(10) Patent No.: US 6,259,020 B1
(45) Date of Patent: Jul. 10, 2001

(54) ASSEMBLY FOR ACCOMMODATING POWER AND DATA LINES FROM INSIDE A WALL STRUCTURE TO A SURFACE MOUNTED RACEWAY

(75) Inventors: William J. Ashline; Thomas R. Russo, both of Bristol, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 09/391,105

(22) Filed: Sep. 7, 1999

(51) Int. Cl.[7] ................................................ H02G 3/04
(52) U.S. Cl. ............................ 174/48; 174/49; 174/68.3
(58) Field of Search ................................. 174/19, 48, 49, 174/68.3, 72 A, 72 C, 72 R, 101; 248/49, 68.1

(56) References Cited

U.S. PATENT DOCUMENTS

| | | | |
|---|---|---|---|
| 3,761,603 | * 9/1973 | Hays et al. | 174/101 |
| 4,591,656 | * 5/1986 | Mohr | 174/48 |
| 4,952,163 | * 8/1990 | Dola et al. | 174/48 |
| 5,257,487 | * 11/1993 | Bantz et al. | 174/58 |
| 5,486,650 | * 1/1996 | Yetter | 174/53 |
| 5,523,529 | * 6/1996 | Holliday | 174/101 |
| 5,784,841 | * 7/1998 | Nowell | 174/49 |
| 5,898,132 | * 4/1999 | Lee | 174/101 |
| 6,018,126 | * 1/2000 | Castellani et al. | 174/48 |

* cited by examiner

Primary Examiner—Dean A. Reichard
Assistant Examiner—Angel R. Estrada
(74) Attorney, Agent, or Firm—McCormick, Paulding & Huber LLP

(57) ABSTRACT

A compartmentalized electrical outlet box defines side-by-side forwardly open compartments for receiving power leads, data lines and telecommunication cables from inside a wall structure. These leads will be connected to corresponding conductors in a raceway that has at least two separated wireways defined in a base channel. Access openings are provided in staggered relationship at the rear wall of the raceway channel so as to be aligned with the compartments in the outlet box.

4 Claims, 2 Drawing Sheets

ASSEMBLY FOR ACCOMMODATING POWER AND DATA LINES FROM INSIDE A WALL STRUCTURE TO A SURFACE MOUNTED RACEWAY

BACKGROUND OF THE INVENTION

This invention relates generally to providing communication between a building's existing electrical system and a surface mounted raceway system. More particularly, the building would be wired within the wall structure itself. The present invention provides the advantages afforded by surface mounted raceway of the type having separate wireways or channels for power and data lines, as well as fiber optic cabling, in combination with an existing building wiring system.

SUMMARY OF THE INVENTION

In accordance with the present invention, a forwardly open outlet box is provided with a plurality of compartments so as to accommodate power lines, data lines, fiber optic cabling and other communication lines. At least one of these compartments has a wall defined by the box with a knockout opening for communicating with a power line, and another of said compartments is defined by said box so as to have a divider wall and knockout opening provided in still another wall of the box so that data and communication lines can be fed into the outlet box within the wall structure in a manner similar to that currently employed in the field, but with the improvement whereby a single box is provided with the necessary number of dividers to accomplish the same result in a more efficient fashion.

In further accordance with the present invention, a raceway assembly is provided over the forwardly open outlet box so that the raceway base serves as a cover for the box. The raceway base includes a rear wall which has staggered openings associated with individual wireways or channels within the raceway in order to afford separate openings through which the power, the line, and other lines or conductors are adapted to be fed from the individual compartments of the outlet box into separate channels or wireways defined by the raceway.

Finally, the raceway base is provided with a mating cover or covers in accordance with conventional practice. As a result of such a system, the power and data lines, as well as other fiber optic cabling or the like, can be separated one from another not only within the existing wall structure of the building, and not only within the raceway assembly itself, but also at the interface between these two structures.

DETAILED DESCRIPTION OF THE DRAWINGS

Figure 1:
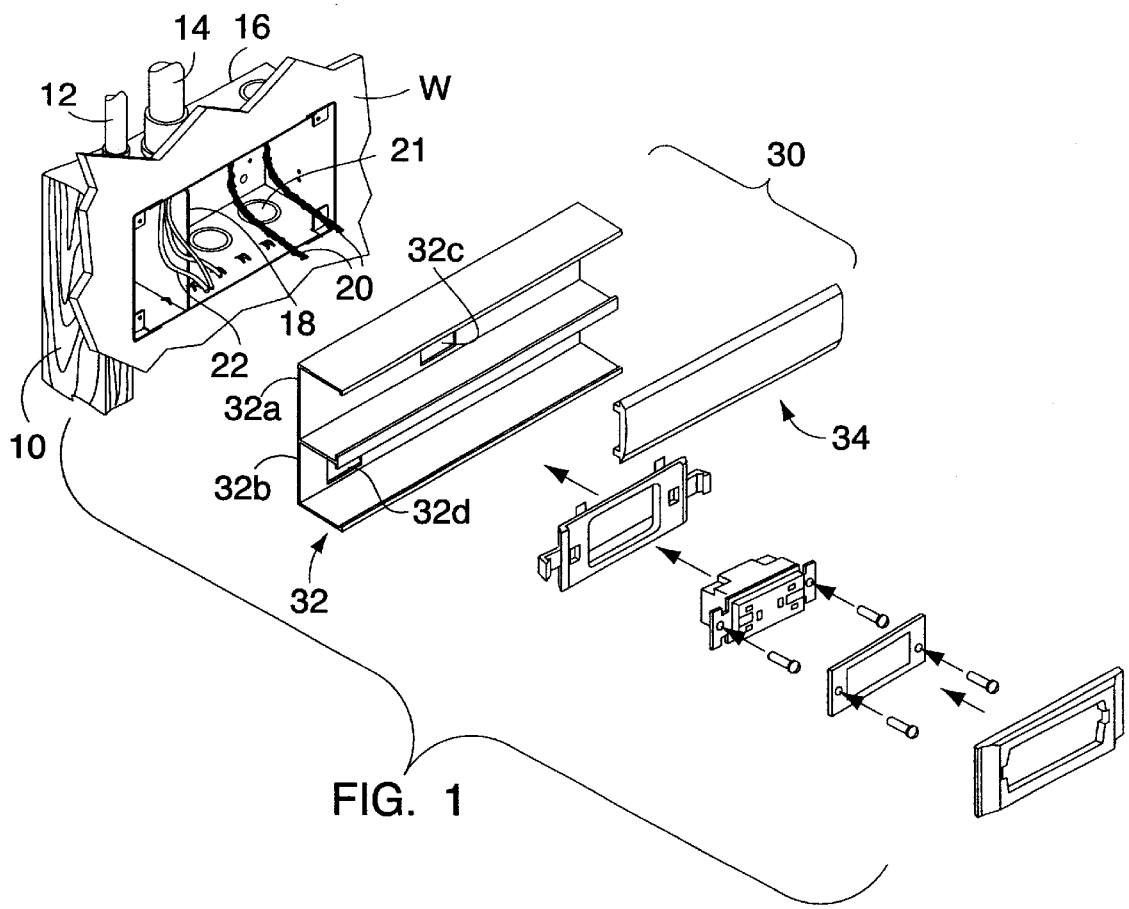
FIG.1 shows an assembly in accordance with the present invention with the wall structure being broken away to reveal the internal wiring, and with the raceway base and cover provided in exploded relationship to better illustrate the staggered openings provided in the raceway base.

Turning now to the drawing in greater detail, FIG. 1 shows a wall structure comprising, in this case, vertically extending studs 10 together with a wall board surface material "w" that is adapted to be fastened to the studs in accordance with conventional practice.

In accordance with the present invention, separate feeds 12 and 14 are provided for the data lines and the power lines, respectively, in order to feed these separated lines into separate compartments defined for this purpose within an outlet box 16. The outlet box 16 is forwardly open and preferably includes a divider wall 18 and may include other such divider walls depending upon the number of compartments to be provided in the outlet box. The number of compartments will correspond to the types of wiring to be accommodated, and it will be apparent that although only two types of wiring are shown, power and data 20 & 22 respectively, other types of cabling may be provided separately from those shown, and fed into the outlet box 16 through knockout openings such as those shown at 21.

The outlet box 16 has a rear wall, top and bottom walls, and end walls, but is forwardly open as shown so that the forward edges of the box 16 are approximately contiguous with the exterior surface of the wall structure "w". Further, it should be noted that the outlet box 16 may include a suitable flange (not shown) that is used to mount the outlet box 16 to one of the studs 10 in accordance with conventional practice.

In accordance with the present invention, an elongated raceway assembly 30 comprising a raceway base 32 and raceway cover or covers 34. The raceway assembly is oriented generally horizontally and extends across in front of the outlet box 16 so as to serve as a closure for the outlet box. More particularly, the raceway base 32 includes a rear wall portians 32a/32b which closes the forwardly open outlet box 16 and more particularly serves as a closure for the individual compartments thereof. In further accordance with the present invention, the portion 32a of the rear wall of the raceway 32 defines an opening 32c for receiving the power lines 20 associated with the larger of the two compartments provided for this purpose in the outlet box 16. In further accordance with the present invention, another opening 32d in the lower portion of the rear wall portians of the raceway 32b not only serves to cover the opening in the outlet box 16 and consequently the forwardly open compartments thereof, but the opening 32d serves to receive the power lines indicated generally at 22 in FIG. 1.

As so constructed and arranged, the raceway base 32 can be mounted across in front of the outlet box 16 so as to serve as a closure for the outlet box and with the openings 32c and 32d, this closure will accommodate the wiring 20 and 22 associated with the power and the data lines for feeding power and data, respectively, to lines associated with and provided in divided channels or wireways provided for this purpose in the raceway assembly 30.

More particularly, in the embodiment shown, the raceway base 32 defines forwardly open channels or wireways which are in turn covered by raceway covers as shown at 34, or in the alternative may instead be covered by a single raceway cover (not shown).

Thus, the present invention provides a convenient assembly whereby separate power and data lines as well as other cabling provided within the wall structure can be fed to separated power, data and cabling raceway channels defined for this purpose in a horizontally extending raceway assembly. The individual channels or wireways within the raceway assembly can be fitted with conventional device brackets mounted in the raceway base or in the covers, to in turn support conventional outlet devices that are appropriate for the power, the data and the fiber optic cabling running in the individual separate channels or wireways of the raceway.

Other variations of this disclosure will be apparent to realize the advantages of the invention. For example, and as shown in FIG. 2, more than two wireway channels in a raceway assembly can be fed from a recessed outlet box having N-1 dividers and N compartments where N equals the number of wireway channels in the raceway assembly.

Figure 2:
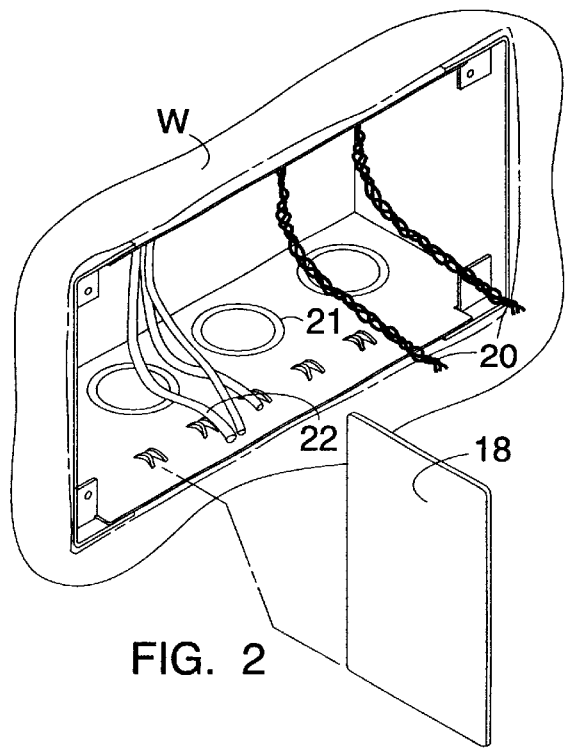
FIG. 2 shows an alternative embodiment which would be used with a raceway having up to four separate channels or wireways.
Figure 3:
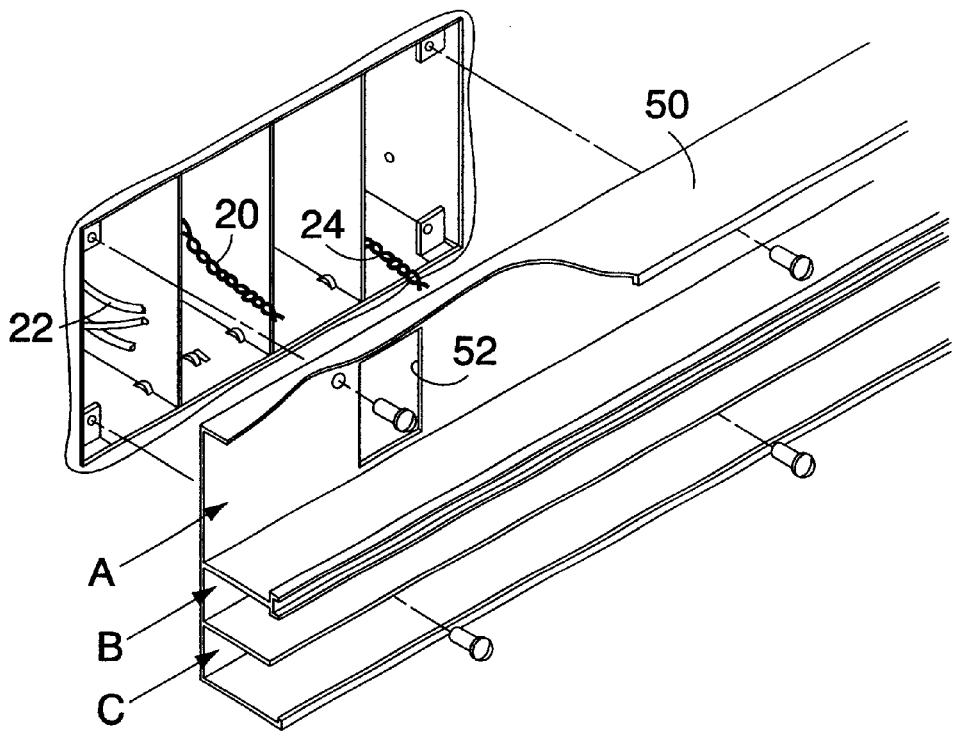
FIG. 3 is an exploded view of the FIG. 2 outlet box recessed in a wall structure, and shows a three channel raceway base having cutouts to receive wiring from the four compartments of the outlet box.

FIG. 3 shows the outlet box of FIG. 2 in a wall structure containing up to four different types of wiring. Power lines 22 in the first compartment are fed through an opening 52 in the rear wall of the elongated raceway 50, and more particularly into the top channel A of the raceway. Additional types of wiring or cabling 20 and 24 provided in other compartments of the outlet box shown can be accommodate in staggered openings (not shown) provided in the raceway back.

Figure 4:
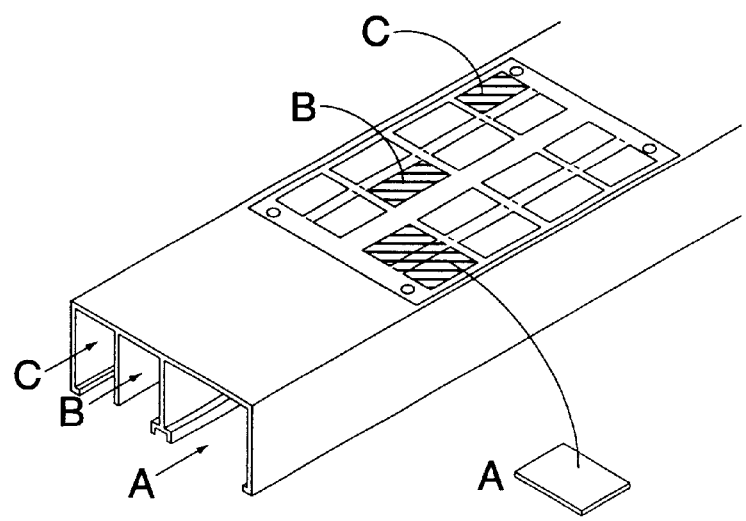
FIG. 4 is a perspective view of the raceway base of FIG. 3 having a template applied to the back of the raceway base to assist the installer in making cutouts to accommodate the wiring per the FIG. 3 assembly.

FIG. 4 shows a template applied to the raceway base of FIG. 3 suitably marked for the installer to form the appropriate cutouts so that the wiring of FIG. 3 (22, 20, and 24) will be available at the appropriate wireway channels (A, B and C respectively).

It is claimed:

1. An assembly for accommodating separate power and data lines in a wall structure, and feeding each of the separate power and data lines into a raceway having separate wireways therefore, said assembly comprising:

an outlet box mounted in the wall structure and having at least one divider wall whereby said box defines at least two compartments, one of said at least two compartments has a wall with a knockout opening for communicating with power lines, and another of said at least two compartments defined by said box and divider wall with another knockout opening for accommodating the data lines, a longitudinally extending raceway having an elongated base of sufficient width to cover said outlet box, said base defining at least two longtitudinally extending separated channels, said separated channel of said raceway base having a common rear wall adapted to abut the surface of said wall and staggered openings in said rear wall alignable with the compartments of the outlet box for accommodating the power and data lines, respectively, from said at least two compartments.

2. The assembly of claim 1 further including a raceway cover means adapted to be fitted onto said raceway base to close said raceway channels.

3. The assembly of claim 2 further including device brackets for said cover means to mount outlet devices which are appropriate for both said power and said data lines in said separated raceway channels.

4. An assembly for accommodating separate power and data lines, said assembly comprising an outlet box for mounting in a pre-existing structure and having at least one divider wall whereby said box defines at least two compartments one of said at least two compartments has a wall with a knock-out opening for communicating with a power line, and another of said at least two compartments defined by said box and divider wall having another knock-out opening for accommodating the data lines, and a longitudinally extending raceway having an elongated base of sufficient width to cover an opening defined by said outlet box, said raceway base defining at least two longitudinally extending separated channels for the power and data lines respectively, said separated channels of said raceway base having staggered openings in said rear wall alienable with the compartments of the outlet box for accommodating the power and data lines respectively from said at least two compartments.

* * * * *

UNITED STATES PATENT AND TRADEMARK OFFICE
CERTIFICATE OF CORRECTION

PATENT NO. : 6,259,020 B1
DATED : July 10, 2001
INVENTOR(S) : Ashline et al.

It is certified that error appears in the above-identified patent and that said Letters Patent is hereby corrected as shown below:

Column 4,
Line 34, please delete [alienable] and substitute with -- alignable --.

Signed and Sealed this

Twenty-sixth Day of February, 2002

Attest:

JAMES E. ROGAN
Attesting Officer
Director of the United States Patent and Trademark Office